United States Patent
Jeong et al.

(10) Patent No.: US 12,381,196 B2
(45) Date of Patent: Aug. 5, 2025

(54) ADHESIVE LAYER COATING UNIT, ELECTRODE ASSEMBLY MANUFACTURING APPARATUS COMPRISING SAME, AND ELECTRODE ASSEMBLY MANUFACTURING METHOD

(71) Applicant: LG Energy Solution, Ltd., Seoul (KR)

(72) Inventors: Hyeok Jeong, Daejeon (KR); Seong Won Choi, Daejeon (KR); Yong Jun Lee, Daejeon (KR); Su Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 130 days.

(21) Appl. No.: 17/924,211

(22) PCT Filed: Aug. 18, 2021

(86) PCT No.: PCT/KR2021/010959
§ 371 (c)(1),
(2) Date: Nov. 9, 2022

(87) PCT Pub. No.: WO2022/039497
PCT Pub. Date: Feb. 24, 2022

(65) Prior Publication Data
US 2023/0187600 A1    Jun. 15, 2023

(30) Foreign Application Priority Data

Aug. 21, 2020  (KR) .................. 10-2020-0105431
Aug. 13, 2021  (KR) .................. 10-2021-0107337

(51) Int. Cl.
*H01M 4/04*   (2006.01)
*B05C 1/08*   (2006.01)
(Continued)

(52) U.S. Cl.
CPC ......... *H01M 4/0409* (2013.01); *B05C 1/0808* (2013.01); *B05C 9/12* (2013.01); *H01M 10/0404* (2013.01)

(58) Field of Classification Search
None
See application file for complete search history.

(56) References Cited

U.S. PATENT DOCUMENTS

2015/0162588 A1   6/2015   Lee et al.
2015/0202647 A1   7/2015   Watanabe et al.
(Continued)

FOREIGN PATENT DOCUMENTS

CN   104584269 B   6/2017
CN   111095647 A   5/2020
(Continued)

OTHER PUBLICATIONS

Machine English translation of JP-2001357839-A, Accessed Jul. 30, 2024 (Year: 2001).*

(Continued)

*Primary Examiner* — Abbas Rashid
*Assistant Examiner* — Adrianna N Konves
(74) *Attorney, Agent, or Firm* — Lerner David LLP

(57) ABSTRACT

The present invention provides an adhesive layer coating unit configured to continuously apply an adhesive layer having a first width in a longitudinal direction of a first separator. The adhesive layer coating unit comprises: a transfer roller configured to support a bottom surface of the first separator and transfer the first separator; a discharge roller configured to transfer the first separator, which has passed through the transfer roller, in conjunction with the transfer roller while supporting a top surface of the first separator, wherein a coating groove having the first width and a closed curve shape is formed in a circumferential (Continued)

surface of the discharge roller; and a coating member configured to inject an adhesive into a space between the discharge roller and the top surface of the first separator which has passed through the transfer roller.

6 Claims, 8 Drawing Sheets

(51) Int. Cl.
*B05C 9/12* (2006.01)
*H01M 10/04* (2006.01)

(56) References Cited

U.S. PATENT DOCUMENTS

| | | | |
|---|---|---|---|
| 2017/0012266 A1 | 1/2017 | Arora et al. | |
| 2017/0282204 A1 | 10/2017 | Watanabe et al. | |
| 2018/0040865 A1* | 2/2018 | Lee | H01M 50/463 |
| 2019/0165424 A1 | 5/2019 | Aritomo et al. | |
| 2020/0127266 A1 | 4/2020 | Kwack et al. | |

FOREIGN PATENT DOCUMENTS

| | | | |
|---|---|---|---|
| JP | 2001357839 A | 12/2001 | |
| JP | 2018520485 A | 7/2018 | |
| JP | 2018174146 A | 11/2018 | |
| JP | WO2018021263 A1 | 5/2019 | |
| JP | 6598933 B2 | 10/2019 | |
| KR | 20010064829 A | 7/2001 | |
| KR | 20120060325 A | 6/2012 | |
| KR | 101319004 B1 | 10/2013 | |
| KR | 20140055801 A | 5/2014 | |
| KR | 101491061 B1 | 2/2015 | |
| KR | 20160028730 A | 3/2016 | |
| KR | 20170022042 A | 3/2017 | |
| KR | 20180015798 A | 2/2018 | |
| KR | 20180115053 A | 10/2018 | |
| KR | 101937715 B1 | 1/2019 | |
| KR | 20190128136 A | 11/2019 | |
| KR | 20200011228 A | 2/2020 | |
| KR | 20200045778 A | 5/2020 | |
| TW | 201531409 A | * | 8/2015 |

OTHER PUBLICATIONS

Machine English translation of JP2018174146, Accessed Nov. 19, 2024 (Year: 2018).*
Machine English translation of TW201531409, Accessed Nov. 19, 2024 (Year: 2015).*
International Search Report for Application No. PCT/KR2021/010959 mailed Nov. 24, 2021, 2 pages.
Extended European Search Report for Application No. 21858584.2 mailed Feb. 12, 2024. 9 pgs.

* cited by examiner

ADHESIVE LAYER COATING UNIT, ELECTRODE ASSEMBLY MANUFACTURING APPARATUS COMPRISING SAME, AND ELECTRODE ASSEMBLY MANUFACTURING METHOD

CROSS-REFERENCE TO RELATED APPLICATION

The present application is a national stage entry under 35 U.S.C. § 371 of International Application No. PCT/KR2021/010959, filed on Aug. 18, 2021, which claims priority to Korean Patent Application No. 10-2020-0105431, filed on Aug. 21, 2020, and Korean Patent Application No. 10-2021-0107337, filed on Aug. 13, 2021, the disclosures of which are hereby incorporated by reference herein in their entireties.

TECHNICAL FIELD

The present invention relates to an adhesive layer coating unit, an electrode assembly manufacturing apparatus comprising same, and an electrode assembly manufacturing method and, particularly, to an adhesive layer coating unit, an electrode assembly manufacturing apparatus comprising same, and an electrode assembly manufacturing method, by which an adhesive layer having uniform width and thickness may be applied on a surface of a separator, and skew fail of the electrode may be prevented by alternately disposing an electrode and the separator coated with the adhesive layer.

BACKGROUND ART

In generally, secondary batteries refer to chargeable and dischargeable batteries unlike primary batteries that are not chargeable, and such a secondary battery is being widely used in the high-tech electronic fields such as phones, laptop computers, and camcorders.

The secondary batteries are classified into a can-type secondary battery, in which an electrode assembly is stored in a metal can, and a pouch-type secondary battery, in which an electrode assembly is stored in a pouch. Also, the pouch-type secondary battery comprises an electrode assembly having an electrode tab, an electrode lead coupled to the electrode tab, and a battery case accommodating the electrode assembly in a state in which a front end of the electrode lead is drawn to the outside. Also, the electrode assembly has a structure in which the electrode and the separator are alternately stacked, and the battery case comprises an accommodation portion for accommodating the electrode assembly and a sealing portion formed along an edge surface of the accommodation portion.

Meanwhile, the method for manufacturing the electrode assembly comprises supplying a first separator, disposing an electrode on a top surface of the first separator, disposing a second separator on a top surface of the electrode, bonding the first separator, the electrode, and the second separator, and cutting first and second separators between electrodes corresponding to each other.

However, during an electrode assembly manufacturing method according to the related art, the position of the electrode disposed between the first and second separators shakes and deviates. That is, skew fail occurs at the electrode.

DISCLOSURE OF THE INVENTION

Technical Problem

An object of the present invention is to provide an adhesive layer coating unit, an electrode assembly manufacturing apparatus comprising same, and an electrode assembly manufacturing method, by which an adhesive layer having uniform width and thickness may be applied on a surface of a separator, and an electrode and the separator are alternately stacked. Thus, the electrode and the separator may be bonded when an electrode assembly is manufactured, and accordingly, it is possible to prevent the electrode from shaking and deviating, that is, skew fail of the electrode may be prevented.

Technical Solution

The present invention provides an adhesive layer coating unit configured to continuously apply an adhesive layer having a first width in a longitudinal direction of a first separator. The adhesive layer coating unit comprises: a transfer roller configured to support a bottom surface of the first separator and transfer the first separator; a discharge roller configured to transfer the first separator, which has passed through the transfer roller, in conjunction with the transfer roller while supporting a top surface of the first separator, wherein a coating groove having the first width and a closed curve shape is formed in a circumferential surface of the discharge roller; and a coating member configured to inject an adhesive into a space between the discharge roller and the top surface of the first separator which has passed through the transfer roller, wherein as the adhesive flows in the coating groove of the discharge roller, the adhesive layer having the first width is continuously applied on the top surface of the first separator.

A depth of the coating groove may be 5 to 15 μm, and the adhesive layer having a thickness of 5 to 15 μm may be applied on the top surface of the first separator.

A center point of the discharge roller may be positioned on a different vertical line from a center point of the transfer roller, and may be positioned above the center point of the transfer roller.

The first width may be less than a width of the first separator.

The adhesive layer may be provided with acrylate or epoxy which is curable monomer.

The adhesive layer coating unit may further comprise a curing member which emits a light source toward the first separator and cures the adhesive layer, which is continuously applied on the first separator, to a set viscosity.

The set viscosity may be 50000 to 100000 cPs at 25° C.

An electrode assembly manufacturing apparatus of the present invention comprises: a first separator supply unit configured to supply a first separator; an adhesive layer coating unit which continuously applies an adhesive layer having a first width in a longitudinal direction of the first separator; an electrode supply unit configured to dispose an electrode on the adhesive layer applied on the first separator; and a second separator supply unit configured to dispose a second separator on a top surface of the electrode.

The electrode assembly manufacturing apparatus may further comprise: a lamination unit configured to bond a stack of the first separator, the electrode, and the second separator which have passed through the second separator supply unit; and a cutting unit configured to cut the first separator and the second separator which are positioned between electrodes facing each other in the stack.

An electrode assembly manufacturing method of the present invention comprises: a first separator supply process of supplying a first separator; an adhesive layer coating process of continuously applying an adhesive layer having a first width in a longitudinal direction of the first separator; an electrode supply process of disposing an electrode on the adhesive layer applied on the first separator; and a second separator supply process of disposing a second separator on a top surface of the electrode disposed on the first separator, wherein the adhesive layer coating process comprises a transfer process of transferring the first separator with a transfer roller while supporting a bottom surface of the first separator, a discharge process of transferring the first separator, which has passed through the transfer roller, with a discharge roller in conjunction with the transfer roller while supporting a top surface of the first separator, wherein a coating groove having the first width and a closed curve shape is formed in a circumferential surface of the discharge roller, and a solution casting process of injecting an adhesive into a space between the discharge roller and the top surface of the first separator which has passed through the transfer roller, wherein as the adhesive flows in the coating groove of the discharge roller, the adhesive layer having the first width is continuously applied on the top surface of the first separator.

The adhesive layer coating process may further comprise a curing process of curing the adhesive layer, which is applied on the first separator, to a set viscosity when the solution casting process is completed.

A depth of the coating groove may be 5 to 15 μm, and the adhesive layer having a thickness of 5 to 15 μm may be applied on the top surface of the first separator.

The adhesive layer may be provided with acrylate or epoxy which is curable monomer.

In the curing process, a light source may be emitted toward the first separator transferred through the discharge roller, and the adhesive layer applied on the first separator may be cured to the set viscosity, wherein as the set viscosity is 50000 to 100000 cPs at 25° C., an adhesive force between the electrode and the first separator may be 20 to 40 gf.

The electrode assembly manufacturing method may further comprise when the second separator supply process is completed: a lamination process of bonding a stack of the first separator, the electrode, and the second separator; and a cutting process of cutting the first and second separators which are positioned between electrodes facing each other in the stack.

Advantageous Effects

The adhesive layer coating unit of the present invention comprises the transfer roller, the discharge roller, the coating member, and the curing member, and thus, the adhesive layer having the first width may be conveniently applied on the surface of the first separator. Accordingly, the work efficiency may be enhanced, and processes may be simplified.

Also, the adhesive layer coating unit of the present invention further comprises a case, and thus, an accommodation space filled with the certain amount of the adhesive may be formed between the case, the transfer roller, and the discharge roller. Accordingly, the adhesive may be uniformly injected or applied on the entirety of the first separator that passes through the transfer roller and the discharge roller.

Also, the curing member of the adhesive layer coating unit of the present invention uses an UV lamp for emitting the light source. Thus, the adhesive may be cured simultaneously when applied on the top surface of the first separator.

Also, the electrode assembly manufacturing apparatus of the present invention comprises the first separator supply unit, the adhesive layer coating unit, the curing unit, the electrode supply unit, and the second separator supply unit. Thus, the adhesive layer is applied on the top surface of the first separator, and accordingly, it is possible to prevent the electrode from shaking and deviating when the electrode and the first separator are disposed, that is, the skew fail of the electrode may be prevented.

Also, in the electrode assembly manufacturing apparatus of the present invention, the center point of the transfer roller and the center point of the discharge roller are positioned on different vertical lines, and the center point of the discharge roller is positioned above the center point of the transfer roller. That is, as the discharge roller is kept at a higher position than the transfer roller, it is possible to prevent the adhesive applied on the first separator between the transfer roller and the discharge roller from running over the discharge roller.

MODE FOR CARRYING OUT THE INVENTION

Figure 1:
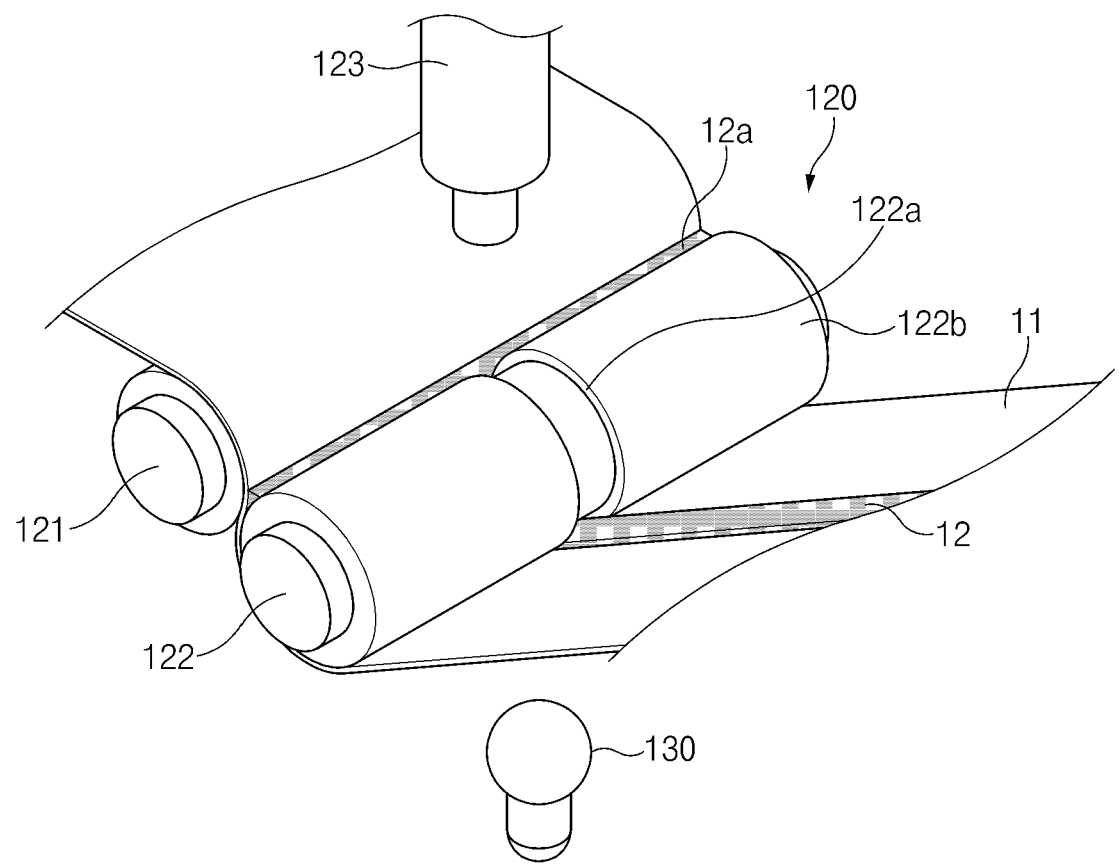
FIG. 1 is a perspective view illustrating an adhesive coating unit according to a first embodiment of the present invention.

Hereinafter, embodiments of the present invention will be described in detail with reference to the accompanying drawings so as to be easily carried out by a person skilled in the art to which the present invention pertains. However, the present invention may be embodied in various different forms, and is not limited to the embodiments described herein. Also, in the drawings, parts irrelevant to the description will be omitted to clearly describe the present invention, and similar elements will be designated by similar reference numerals throughout the specification.

Electrode Assembly of the Present Invention

Figure 4:
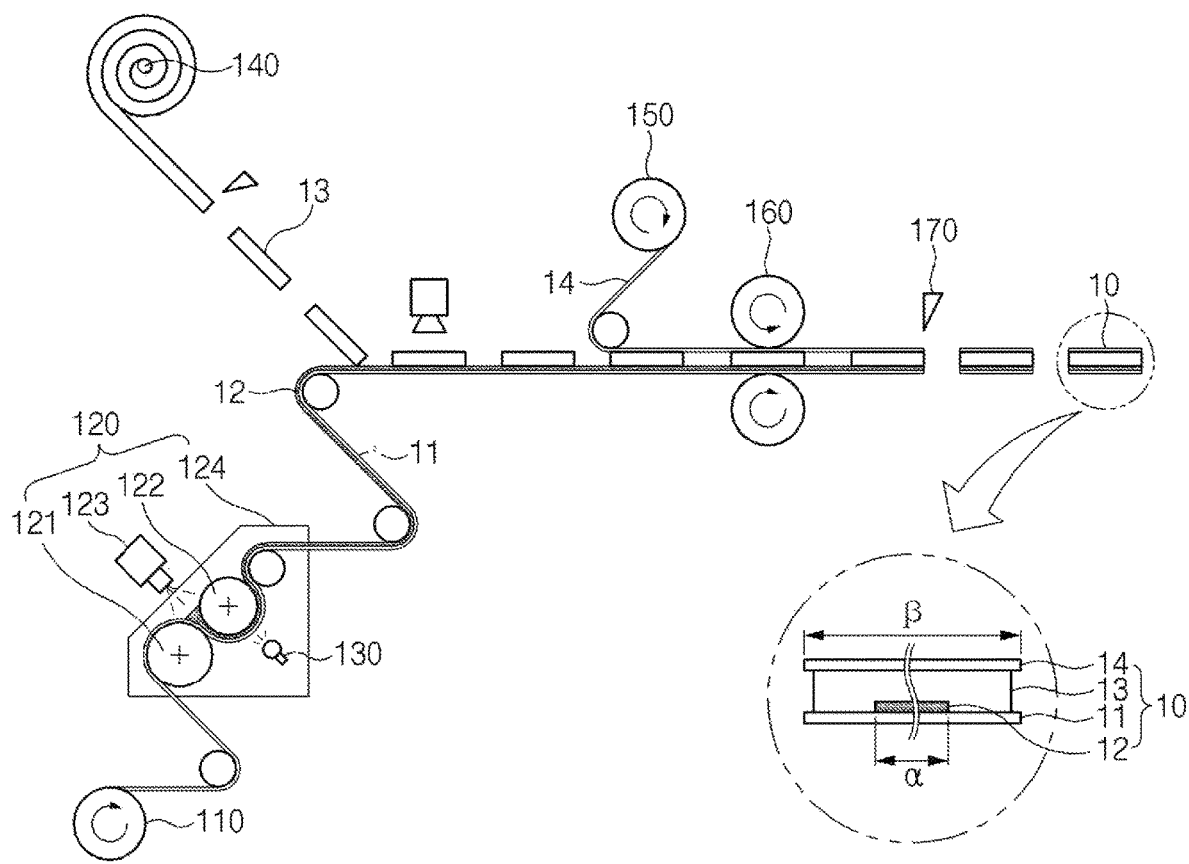
FIG. 4 is a process view schematically illustrating an electrode assembly manufacturing apparatus according to a second embodiment of the present invention.

Referring to FIG. 4, the electrode assembly of the present invention comprises one or more electrode assemblies 10, and each of the electrode assemblies 10 has a structure in which a first separator 11, an adhesive layer 12, an electrode 13, and a second separator 14 are alternately arranged.

Here, referring to the enlarged view of FIG. 4, the adhesive layer 12 having a first width is provided on the top surface of the first separator and has an entirely uniform thickness. Particularly, a first width α of the adhesive layer 12 is set to 3 to 7% of an overall width β of the first separator, preferably, to 5%.

In the electrode assembly having the above structure of the present invention, the adhesive layer 12 may prevent the electrode 13 disposed on the top surface of the first separator 11 from shaking and deviating, that is, skew fail of the electrode may be prevented. Furthermore, it is possible to prevent battery performance from deteriorating by optimizing the width of the adhesive layer.

Meanwhile, the first separator coated with the adhesive layer is manufactured through the adhesive layer coating unit according to a first embodiment of the present invention.

Adhesive Layer Coating Unit According to a First Embodiment of the Present Invention The adhesive layer coating unit according to the first embodiment of the present invention has a structure capable of continuously applying an adhesive layer having the same width and thickness on a surface of a separator through a novel method. Accordingly, work efficiency may be enhanced, and processes may be simplified.

Figure 2:
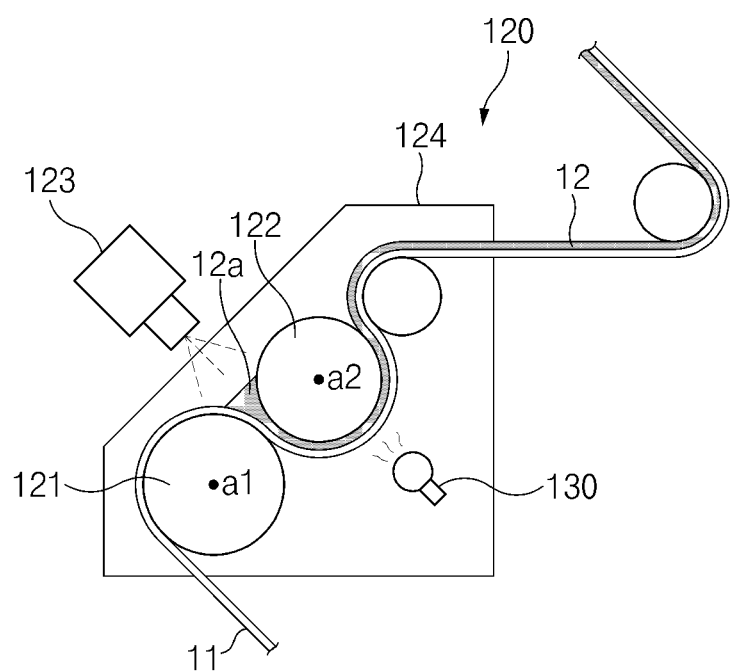
FIG. 2 is a side cross-sectional view illustrating the adhesive coating unit according to the first embodiment of the present invention.
Figure 3:
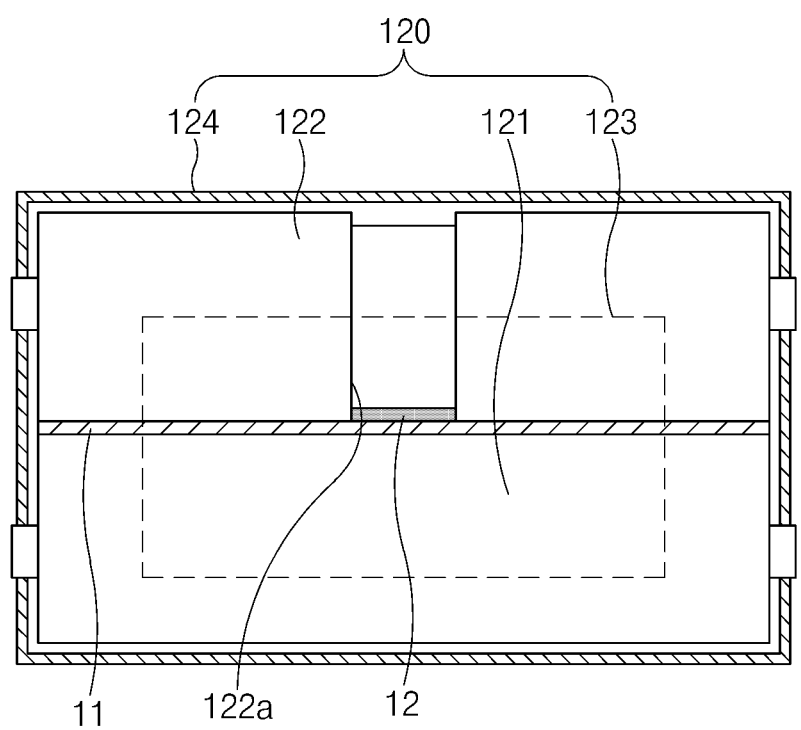
FIG. 3 is a plane cross-sectional view illustrating the adhesive coating unit according to the first embodiment of the present invention.

That is, as illustrated in FIGS. 1 to 3, an adhesive layer coating unit 120 according to the first embodiment of the present invention is to continuously apply the adhesive layer 12 in the longitudinal direction of the first separator 11. Particularly, the adhesive layer coating unit 120 may apply a plurality of adhesive layers 12 in the width direction of the first separator 11, that is, the adhesive layer coating unit 120 has a structure patterning and coating the surface of the first separator with the adhesive layers.

As one example, the adhesive layer coating unit 120 comprises a transfer roller 121, a discharge roller 122, a coating member 123, and a curing member 130.

Transfer Roller

The transfer roller 121 supports the bottom surface of the first separator 11 and moves the first separator 11 from one side to the other side (left to right when viewed in FIG. 1) when rotating.

Discharge Roller

The discharge roller 122 transfers the first separator 11, which has passed through the transfer roller 121, in conjunction with the transfer roller 121 while supporting a top surface of the first separator 11. A coating groove 122a having a first width and a closed curve shape is formed in a circumferential surface of the discharge roller. Here, the first width α is less than a width β of the first separator.

That is, the discharge roller 122 comprises the coating groove 122a having the closed curve shape and a supporting surface 122b transferring the first separator 11 while supporting the first separator 11.

Coating Member

The coating member 123 injects an adhesive 12a into a gap between the discharge roller 122 and the top surface of the first separator 11 which has passed through the transfer roller 121. So, as the adhesive 12a flows in the coating groove 122a of the discharge roller 122, the adhesive layer 12 having the first width is connectively applied on the top surface of the first separator 11.

Meanwhile, the coating member 123 comprises a storage tank, in which the adhesive is stored, and an injection nozzle, which injects the adhesive stored in the storage tank into the gap between the discharge roller 122 and the top surface of the first separator 11.

In the adhesive layer coating unit 120 having the above structure according to the first embodiment of the present invention, when the first separator 11 is transferred by the transfer roller 121 and the discharge roller 122, the coating member 123 applies the adhesive into the gap between the discharge roller 122 and the top surface of the first separator 11 which has passed through the transfer roller 121. So, as the adhesive 12a flows only in the coating groove 122a of the discharge roller 122, the adhesive layer 12 having the first width is connectively applied in the longitudinal direction of the first separator 11.

Here, the adhesive layer 12 has the same width and thickness as the coating groove 122a. Meanwhile, due to the supporting surface 122b of the discharge roller 122, an adhesive layer is not formed on the remainder of the first separator 11 other than the coating groove 122a.

Thus, the adhesive layer coating unit 120 according to the first embodiment of the present invention may continuously apply the adhesive layer 12 in the longitudinal direction of the first separator 11. Accordingly, work efficiency may be enhanced, and processes may be simplified.

Particularly, the adhesive layer coating unit 120 according to the first embodiment of the present invention may continuously apply the adhesive layer having the same width and thickness on the surface of the separator even without a separate adjustment process.

Meanwhile, the discharge roller 122 may further comprise at least one coating groove having a second width on the circumferential surface thereof, and accordingly, the surface of the first separator may be patterned and coated with two or more adhesive layers.

Particularly, the first width and the second width may be equal to each other or different from each other. That is, when the first width and the second width are equal to each other, the surface of the first separator may be patterned and coated with the adhesive layers having the same width. When the first width and the second width are different from each other, the surface of the first separator may be patterned and coated with the adhesive layers having different widths.

Meanwhile, the depth of the coating groove 122a is 5 to 15 μm, preferably, 8 to 10 μm. Accordingly, the adhesive layer 12 having the thickness of 5 to 15 μm, preferably, the adhesive layer 12 having the thickness of 8 to 10 μm may be applied on the top surface of the first separator 11.

Here, when the depth of the coating groove 122a is 5 mm or less, the adhesive layer does not smoothly flow in the coating groove 122a, and thus, a defective adhesive layer 12 may be formed. Also, when the depth of the coating groove 122a is 15 mm or more, the number of stacked electrodes may be reduced due to the increase in the thickness of the stack, and as a result, the battery performance may deteriorate.

Thus, the depth of the coating groove 122a is 5 to 15 μm. Accordingly, the adhesive layer 12 having the thickness of 5 to 15 μm may be stably applied on the top surface of the first separator 11, and battery performance may be stably ensured.

Meanwhile, the discharge roller 122 is positioned above the transfer roller 121 when viewed in FIG. 2. That is, a center point a1 of the transfer roller 121 and a center point a2 of the discharge roller 122 are positioned on different vertical lines, and the center point a2 of the discharge roller 122 is positioned above the center point a1 of the transfer roller 121 when viewed with respect to the ground. Accordingly, it is possible to prevent the adhesive 12a applied on the first separator 11 between the transfer roller 121 and the discharge roller 122 from running over the discharge roller 122.

Meanwhile, the coating member 123 applies the adhesive 12a on the top surface of the first separator 11 through a solution casting process, and accordingly, the adhesive 12a may be stably applied on the top surface of the first separator 11.

Meanwhile, the area of the adhesive 12 is set not to exceed 5% of the entire area of the first separator 11. That is, when the area of the adhesive layer 12 is greater than 5% of the area of the first separator 11, the battery performance deteriorates by 3% or more.

Meanwhile, the adhesive layer coating unit 120 further comprises a case 124. The transfer roller 121 and the discharge roller 122 are installed inside the case 124, and both ends between the transfer roller 121 and the discharge roller 122 are finished thereby.

That is, the transfer roller 121 and the discharge roller 122 are free-rotatably installed in the case 124, and both inner walls thereof finish side portions between the transfer roller 121 and the discharge roller 122. Accordingly, the case may prevent the adhesive applied on the first separator between the transfer roller 121 and the discharge roller 122 from flowing down toward both the side portions of the transfer roller 121 and the discharge roller 122.

Meanwhile, the adhesive layer coating unit according to the first embodiment of the present invention further comprises a curing member 130 that cures the adhesive layer, which has been applied on the first separator, to a set viscosity.

Curing Member

The curing member 130 is provided below the discharge roller 122, and emits a light source toward the first separator 11, which is transferred along the discharge roller 122, and cures the adhesive layer 12 applied on the first separator 11.

Here, the curing member 130 may use one of a mercury lamp, a metal halide lamp, or a UV LED so as to increase curing strength of the adhesive layer 12 applied on the first separator 11. Particularly, the UV LED is used. Here, when the UV LED is used, the intensity of the light source having 0.5 J/cm$^2$ is applied.

Meanwhile, the curing member 130 cures the adhesive layer such that the adhesive layer does not infiltrate into 30% or more of the thickness of the first separator, preferably, 20% or more. Accordingly, the coupling between the adhesive layer and the first separator 11 may be enhanced while minimizing the thickness deviation of the adhesive layer 12.

Meanwhile, the set viscosity may be 50000 to 100000 cPs at 25° C., preferably, 6500 cPs. Here, when the set viscosity is 50000 cPs or less, all the adhesive infiltrate into the porous separator, and the adhesive may flow out from the opposite surface of the separator. When 100000 cPs or more, it is difficult to blend the adhesive, the adhesive is not injected into the coating groove 122a due the poor flowability. Thus, the set viscosity may be 50000 to 100000 cPs at 25° C., and accordingly, the adhesive layer may be stably applied on the top surface of the first separator.

Meanwhile, when the set viscosity is 50000 to 100000 cPs at 25° C., an adhesive force between the electrode and the first separator is 20 to 40 gf.

Meanwhile, the adhesive layer is provided with a curable material. For example, the adhesive is provided with acrylate or epoxy which is a monomer. Particularly, the acrylate or epoxy has the high curing strength due to a UV light source.

Hereinafter, in describing another embodiment of the present invention, components having the same functions as those in the foregoing embodiment are given the same reference numerals, and their duplicated description will be omitted.

Electrode Assembly Manufacturing Apparatus According to a Second Embodiment of the Present Invention An electrode assembly manufacturing apparatus 100 according to the second embodiment of the present invention comprises the adhesive layer coating unit 120 according to the first embodiment described above.

That is, as illustrated in FIG. 4, the electrode assembly manufacturing apparatus 100 according to the second embodiment of the present invention is to manufacture a stack 10, in which a first separator 11, an adhesive 12, an electrode 13, and a second separator 14 are stacked in this order, and comprises a first separator supply unit 110, an adhesive layer coating unit 120, a curing member 130, an electrode supply unit 140, a second separator supply unit 150, a lamination unit 160, and a cutting unit 170.

First Separator Supply Unit

The first separator supply unit 110 has a roller structure, on which the first separator 11 is wound, and supplies the wound first separator 11 to the adhesive layer coating unit 120 when rotating.

Adhesive Layer Coating Unit

The adhesive layer coating unit 120 is to continuously apply the adhesive layer 12 having a first width in the longitudinal direction of the first separator 11, and comprises a transfer roller 121, a discharge roller 122, a coating member 123, and a curing member 130.

Meanwhile, the adhesive layer coating unit 120 has the same configuration and function as the adhesive layer coating unit of the first embodiment, and accordingly, detailed description thereof will be omitted.

Particularly, the adhesive layer coating unit 120 has a structure that patterns and coats the top surface of the first separator 11 with the adhesive layer 12.

That is, the adhesive layer coating unit 120 comprises: the transfer roller 121 which supports the bottom surface of the first separator 11 and transfers the first separator 11 from one side to the other side (left to right when viewed in FIG. 1);

the discharge roller 122 which supports the top surface of the first separator 11 passing through the transfer roller 121, transfers the first separator 11 to the electrode supply unit 140, and has a coating groove 122a extending along the outer circumferential surface and having a closed curve shape; and the coating member 123 which applies an adhesive 12a on the top surface of the first separator 11 passing through between the transfer roller 121 and the discharge roller 122. As the adhesive 12a flows in the groove 122a of the discharge roller 122, the top surface of the first separator 11 is patterned and coated with the adhesive layer 12.

Electrode Supply Unit

The electrode supply unit 140 disposes the electrode 13 on the top surface of the first separator 11 coated with the adhesive layer 12. Here, the electrode 13 is attached to the top surface of the first separator 11 by the adhesive force of the adhesive layer 12, and accordingly, the skew fail of the electrode may be prevented.

Second Separator Supply Unit

The second separator supply unit 150 disposes the second separator 14 on the top surface of the electrode 13, and the second separator 14 is disposed symmetrically to the first separator 11. Thus, the stack 10 is completed in which the first separator 11, the adhesive 12, the electrode 13, and the second separator 14 are stacked in this order.

Lamination Unit

The lamination unit 160 presses and bonds the stack 10 which has passed through the second separator supply unit 150.

Cutting Unit

Figure 5:
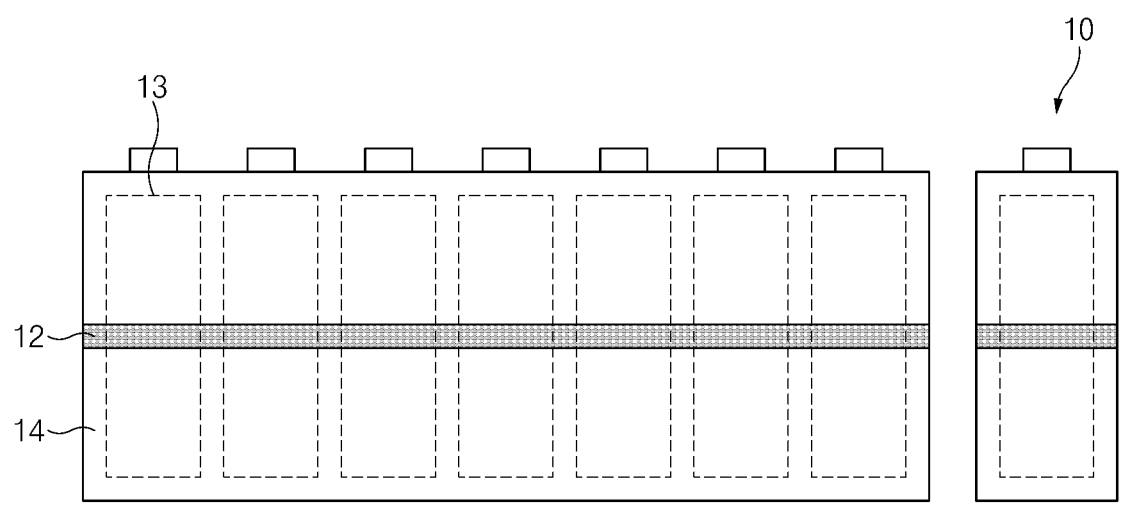
FIG. 5 is a plan view illustrating a stack which is manufactured through the electrode assembly manufacturing apparatus according to the second embodiment of the present invention.

Referring to FIG. 5, the cutting unit 170 cuts the first separator 11 and the second separator 14 which are positioned between electrodes 13 facing each other in the stack 10.

Thus, the electrode assembly manufacturing apparatus according to the second embodiment of the present invention may manufacture the stack 10 of the first separator 11, the adhesive layer 12, the electrode 13, and the second separator 14. Particularly, the first separator 11 and the electrode 13 are bonded by the adhesive layer 12, and thus, the skew fail of the electrode 13 may be prevented. As a result, productivity may be enhanced, and a defect rate may be reduced.

Hereinafter, an electrode assembly manufacturing method according to the second embodiment of the present invention will be described.

Figure 6:
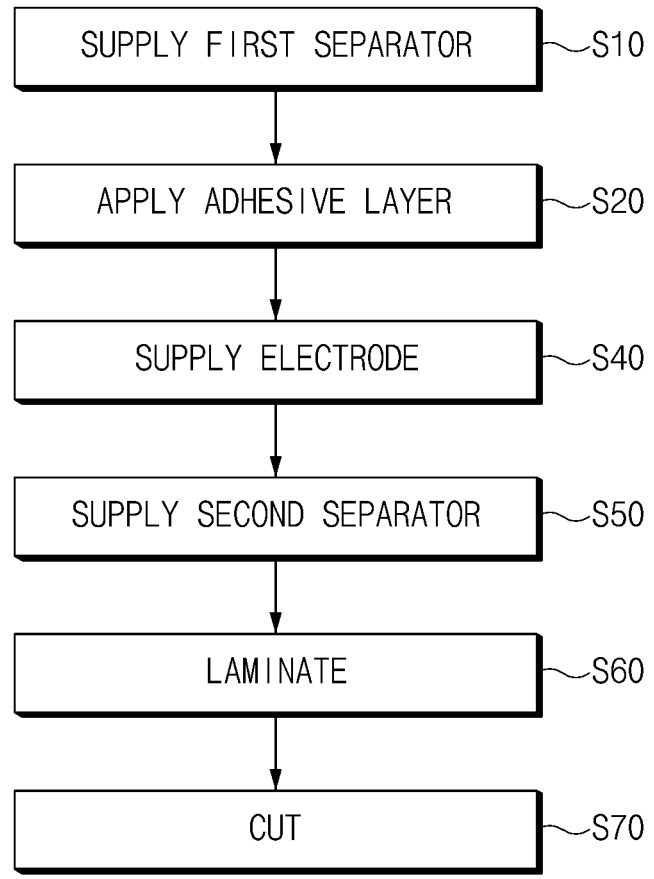
FIG. 6 is a flowchart showing the electrode assembly manufacturing method according to the second embodiment of the present invention.

Electrode Assembly Manufacturing Method According to the Second Embodiment of the Present Invention As illustrated in FIG. 6, the electrode assembly manufacturing method according to the second embodiment of the present invention comprises a first separator supply process (S10), an adhesive layer coating process (S20), a curing process (S30), an electrode supply process (S40), a second separator supply process (S50), a lamination process (S60), and a cutting process (S70).

First Separator Supply Process

The first separator supply process (S10) supplies a first separator 11, which is wound on a first separator supply unit 110, to the adhesive layer coating process.

Adhesive Layer Coating Process

The adhesive layer coating process (S20) applies an adhesive on the top surface of the first separator 11 through an adhesive layer coating unit 120, and thus, the top surface is coated with an adhesive layer 12. Particularly, the adhesive layer coating process (S20) continuously applies the adhesive layer 12 in the longitudinal direction of the first separator 11.

That is, the adhesive layer coating process (S20) comprises a transfer process, a discharge process, a solution casting process, and a curing process. Also, the adhesive layer coating unit 120 comprises a transfer roller 121, a discharge roller 122, a coating member 123, a case 124, and a curing member 130.

In the transfer process, when the first separator 11 is supplied through the first separator supply process (S10), the transfer roller 121 transfers the first separator 11 to the discharge roller 122 while supporting the bottom surface of the first separator 11.

In the discharge process, the discharge roller 122 transfers the first separator 11, which has passed through the transfer roller 121, to the electrode supply unit 140 in conjunction with the transfer roller 121 while supporting the top surface of the first separator 11. Meanwhile, a coating groove 122a having a closed curve shape is formed in a circumferential surface of the discharge roller 122.

In the solution casting process, an adhesive 12a is injected, through the coating member 123, into a gap between the discharge roller 122 and the top surface of the first separator 11 which has passed through the transfer roller 121. Thus, as the adhesive 12a injected on the top surface of the first separator 11 flows only in the coating groove 122a of the discharge roller 122, the adhesive layer 12 having the same shape and width as the coating groove may be applied on the top surface of the first separator 11.

For example, when the coating groove is formed having a depth of 5 to 15 μm, the adhesive layer applied on the first separator 11 may have the thickness of 5 to 15 μm.

In the curing process, the adhesive layer 12 applied on the first separator 11 may be cured to a set viscosity. That is, in the curing process, a light source (high-temperature light or heat) is emitted, by using the curing member 130, toward the first separator 11 transferred along the discharge roller 122. Thus, the adhesive layer 12 applied on the first separator may be cured to a set viscosity. Here, curing strength of the curing member 130 may be adjusted such that the adhesive layer does not infiltrate into 30% or more of the thickness of the first separator 11, preferably, 20% or more.

Meanwhile, an appropriate viscosity of the adhesive is 50000 to 100000 cPs at 25° C., and accordingly, the adhesive may be cured so as not to infiltrate into 30% or more of the thickness of the first separator 11. Here, the adhesive force between the electrode and the first separator is 20 to 40 gf.

Meanwhile, the adhesive layer is provided with a curable material. For example, the adhesive layer is provided with acrylate or epoxy which is a monomer, and accordingly, the curing strength of the adhesive may be enhanced.

Also, the curing member 130 may be one of a mercury lamp, a metal halide lamp, or a UV LED so as to increase curing strength of the adhesive layer 12 applied on the first separator 11. Preferably, the UV LED is used.

Meanwhile, the solution casting process and the curing process are performed simultaneously, and thus, the adhesive may be applied on the first separator and simultaneously cured. Accordingly, the processes may be simplified, and the adhesive may be prevented from adhering on the discharge roller.

Electrode Supply Process

The electrode supply process (S40) disposes an electrode 13 on the adhesive layer 12 applied on the first separator 11. Thus, as the electrode 13 is bonded to the first separator 11 by the adhesive layer 12, the adhesive force may be enhanced. Accordingly, it is possible to prevent the electrode from shaking and deviating when the first separator, on which the electrode is disposed, is transferred.

Second Separator Supply Process

The second separator supply process (S50) disposes the second separator 14 on the top surface of the electrode 12 disposed on the first separator 11. Thus, the stack 10 is completed in which the first separator 11, the adhesive 12, the electrode 13, and the second separator 14 are stacked in this order. Here, the electrode 13 is maintained while being bonded to the first separator 11 by the adhesive layer 12, and accordingly, the skew fail of the electrode 13 may be prevented.

Lamination Process

The lamination process (S60) rolls and bonds the stack 10 in which the first separator 11, the adhesive layer 12, the electrode 13, and the second separator 14 are stacked in this order.

Cutting Process

The cutting process (S70) cuts the first and second separators 11 and 14 positioned between electrodes 13 facing each other in the stack, and thus, complete stacks having a certain size are manufactured.

Experimental Example

The adhesive force of the electrode, which is provided in the complete product manufactured by the electrode assembly manufacturing method according to the second embodiment of the present invention, is measured.

That is, the adhesive layer having an acrylate material which is a curable monomer is applied on the top surface of the first separator, and thus, the top surface is coated with the adhesive layer 12. Then, the adhesive layer 12 is cured, through the curing member, to a set hardness. Next, the electrode is disposed on the adhesive layer 12 applied on the first separator, and the second separator is disposed on the top surface of the electrode. Accordingly, the complete stack is manufactured.

Here, the thickness of the adhesive layer is 7 to 8 μm, the hardness of the adhesive layer is 6500 cPs. Also, the curing member uses the UV LED, and the intensity of the UV LED having 0.5 J/cm² is applied. Here, it may be confirmed that the adhesive layer infiltrates into 20% or more of the thickness of the first separator.

Experimental Results

Figure 7:
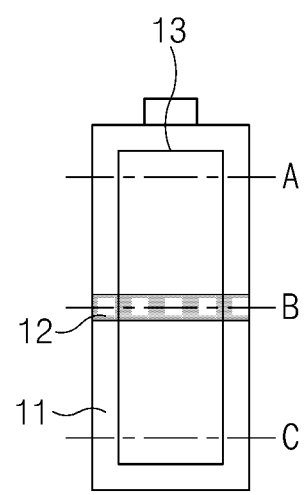
FIG. 7 is a view showing a preparation example which is manufactured by the electrode assembly manufacturing apparatus according to the second embodiment of the present invention.

As illustrated in FIG. 7, the adhesive forces are measured at three points of the complete stack. That, an upper region A and a lower region C of the complete stack, which do not have the adhesive layer 12, and a central region B of the complete stack, which has the adhesive layer 12, are measured with respect to the adhesive forces.

Figure 8:
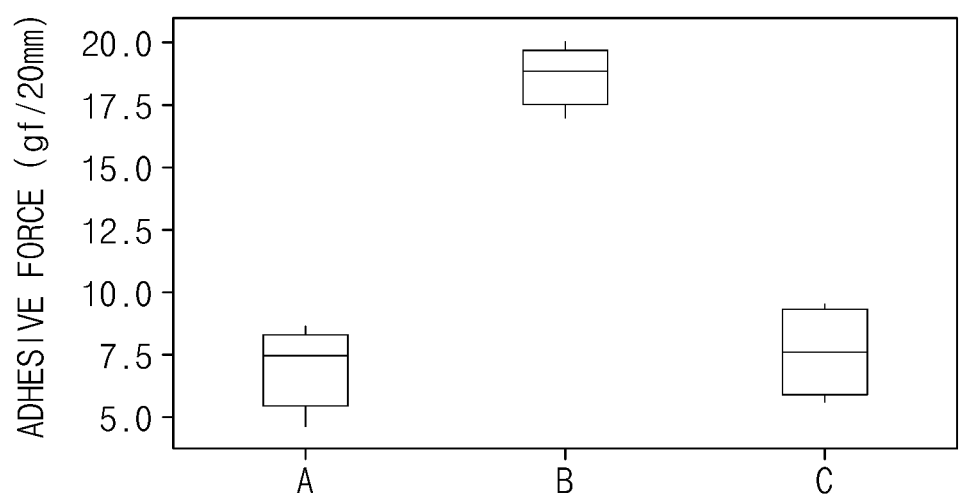
FIG. 8 is a graph in which adhesive forces of preparation examples manufactured by the electrode assembly manufacturing apparatus according to the second embodiment of the present invention are measured.

As a result, as illustrated in FIG. 8, the coupling force between the electrode and the first separator is measured to 18 to 25 gf in the region B in which the adhesive layer is positioned. Also, the coupling force between the electrode and the first separator is measured to 6 to 8 gf in each of the regions A and C which do not have the adhesive layer.

Thus, it may be confirmed that the adhesive force of the region B is 2.5 times as high as those of the regions A and C, and accordingly, it is possible to significantly prevent the electrode disposed on the first separator from deviating.

The scope of the present invention is defined by the appended claims rather than the detailed description, and various embodiments derived from the meaning and scope of the claims and their equivalent concepts are also possible.

DESCRIPTION OF THE SYMBOLS a1: Center point of transfer roller
a2: Center point of discharge roller
11: First separator
12: Adhesive layer
12a: Adhesive
13: Electrode
14: Second separator
100: Electrode assembly manufacturing apparatus
110: First separator supply unit
120: Adhesive layer coating unit
121: Transfer roller
122: Discharge roller
122a: Coating groove
123: Coating member
124: Case
130: Curing member
140: Electrode supply unit
150: Second separator supply unit
160: Lamination unit
170: Cutting unit

The invention claimed is:

1. An adhesive layer coating unit configured to continuously apply an adhesive layer having a first width in a longitudinal direction of a first separator, the adhesive layer coating unit comprising:
   a transfer roller configured to support a bottom surface of the first separator and to move the first separator;
   a discharge roller configured to move the first separator in conjunction with the transfer roller while supporting a top surface of the first separator, the discharge roller defining a coating groove having the first width in a direction parallel to a rotational axis of the discharge roller and a closed curve shape extending below an outer circumferential surface of the discharge roller, the first width being 3-7% of a width of the first separator; and
   a coating member configured to inject an adhesive into the coating groove between the discharge roller and the top surface of the first separator, the coating member being configured to continuously apply a continuous line of the adhesive layer having the first width onto the top surface of the first separator.

2. The adhesive layer coating unit of claim 1, wherein a depth of the coating groove is 5 to 15 μm below the outer circumferential surface of the discharge roller, the discharge roller being configured to apply the adhesive layer having a thickness of 5 to 15 um onto the top surface of the first separator.

3. The adhesive layer coating unit of claim 2, wherein a center point of the discharge roller is spaced apart from a center point of the transfer roller.

4. The adhesive layer coating unit of claim 1, wherein the adhesive layer comprises a curable acrylate or epoxy.

5. The adhesive layer coating unit of claim 1, further comprising a curing member configured to continuously emit a light source toward the first separator to cure the adhesive layer to a predetermined viscosity.

6. The adhesive layer coating unit of claim 5, wherein the predetermined viscosity is 50000 to 100000 cPs at 25° C.

* * * * *